United States Patent
Burn et al.

(10) Patent No.: US 7,121,016 B2
(45) Date of Patent: Oct. 17, 2006

(54) METHOD OF REGENERATING AN AIR DRYER IN A VEHICLE AIR SYSTEM

(75) Inventors: Richard Burn, Huddersfield (GB); Ignitius Milomo, Bradford (GB); Andrew George Livingston Blackwood, Shipley (GB)

(73) Assignee: Wabco Automotive UK Limited, (GB)

( * ) Notice: Subject to any disclaimer, the term of this patent is extended or adjusted under 35 U.S.C. 154(b) by 177 days.

(21) Appl. No.: 10/485,550

(22) PCT Filed: Jul. 19, 2002

(86) PCT No.: PCT/GB02/03328

§ 371 (c)(1),
(2), (4) Date: Jul. 19, 2004

(87) PCT Pub. No.: WO03/013929

PCT Pub. Date: Feb. 20, 2003

(65) Prior Publication Data

US 2004/0242144 A1    Dec. 2, 2004

(30) Foreign Application Priority Data

Aug. 6, 2001 (GB) ................................. 0119149.3

(51) Int. Cl.
*F26B 3/00* (2006.01)

(52) U.S. Cl. ............................. 34/330; 34/355; 95/96; 95/117

(58) Field of Classification Search .................. 34/330, 34/355; 95/96, 117
See application file for complete search history.

(56) References Cited

U.S. PATENT DOCUMENTS

| 4,247,311 A | * | 1/1981 | Seibert et al. ................. 96/111 |
| 4,275,448 A | | 6/1981 | Le Dall |
| 4,546,442 A | | 10/1985 | Tinker |
| 5,592,754 A | * | 1/1997 | Krieder et al. ................. 34/527 |

FOREIGN PATENT DOCUMENTS

| DE | 31 40 455 A1 | 5/1983 |
| EP | 0 199 948 A | 11/1986 |

* cited by examiner

*Primary Examiner*—S. Gravini
(74) *Attorney, Agent, or Firm*—Nixon Peabody LLP; Jeffrey L. Costellia

(57) ABSTRACT

A vehicle air system has an air dryer which is periodically regenerated by reverse flow of dry air. The regeneration threshold is variable, and determined according to the operating state of the vehicle. The operating state is in turn determined from easily measurable vehicle status parameters, preferably in the form of on/off or in/out signals.

10 Claims, No Drawings

METHOD OF REGENERATING AN AIR DRYER IN A VEHICLE AIR SYSTEM

This invention relates to an air system of a vehicle, and particularly to active management of regeneration of the usual air dryer.

Air systems are typically used on heavy trucks and rely on air under pressure to operate the vehicle brake actuators. Air is usually supplied from an engine driven compressor to a high pressure reservoir, and thence supplied to the brake actuators via a foot operated demand valve. Means are provided to bring the compressor on and off-load according to air demand; the compressor is typically taken off-load by holding a delivery valve open and/or by opening the delivery port to atmosphere.

When under load, air from the compressor is always passed through an air dryer upstream of the reservoir since moisture in the braking system may adversely affect the life and performance of the components of the braking system. A typical air dryer comprises a cartridge of desiccant material. Periodically the air dryer must be regenerated by driving accumulated moisture in the desiccant out to atmosphere, and this is done by expanding a small volume of high pressure dry air through the desiccant in reverse; during this operation the compressor is of course off-load.

In normal use, pressure in the reservoir is depleted by consumer circuits, and at a predetermined lower pressure the compressor is brought on-load. Pressure in the reservoir consequently rises until a higher cut-off pressure is reached, at which time the compressor is taken off-load.

The vehicle braking system is a primary part of the vehicle air system. However air under pressure may also be used for e.g. air suspension, gearshift, servo assistance, door controls etc.

Conventionally desiccant regeneration is triggered as the compressor is taken off-load, and irrespective of the volume and quality of air passing through the desiccant cartridge. Regeneration may be relatively frequent during some kinds of town driving if the compressor is repeatedly allowed to reach cut off pressure. In these circumstances the desiccant is regenerated when only a small volume of air has passed therethrough to the reservoir, and thus occurs at well below the volumetric design-capacity of the air dryer. The consequence is that much dry air is wasted through unnecessary regeneration, and this in turn increases fuel consumption and decreases compressor life. Similar problems occur in certain kinds of highway driving.

On the other hand, frequent application of the vehicle brakes in town driving may result in incomplete regeneration because the relatively high air consumption causes the compressor to be brought on-load before a regeneration cycle can be completed. The desiccant may thus progressively become rather saturated. In a conventional system, no measurement is made of the level of wetness and accordingly no recovery strategy can be implemented to bring a wet air dryer to a dry state.

Direct measurement of air moisture content, and/or the level of moisture in the desiccant has been proposed but has not been adopted for reasons of cost, reliability and technical deficiencies.

It has been proposed to trigger regeneration on a time basis, but this is unsatisfactory because the time interval must be set according to the maximum duty cycle of the vehicle.

This means that for normal and low duty vehicle cycles (with low air consumption), significant volumes of dry air will be frequently expanded on a time basis through the desiccant cartridge, which thus remains significantly below an optimum saturation level most of the time. In the case of very frequent brake application, the timer will continually be re-set each time the compressor comes on-load. Furthermore a safety factor must be included, with the result that regeneration occurs more frequently than is necessary in most vehicle duty cycles. What is required is a control system which can regenerate the desiccant at a level of optimum saturation, thus reducing the wastage of dry air, and in turn avoiding unnecessary pumping by the compressor, and also reducing the risk of under purging during time of high air consumption (e.g. frequent brake applications).

A complication of regeneration control is that air cannot flow through the air dryer cartridge simultaneously in both directions. Consequently, regeneration must be inhibited at times when the compressor is on-load in order to satisfy a demand for air in the braking system. A better means of air dryer control is therefore required.

According to a first aspect of the invention there is provided a method of regenerating an air dryer in a vehicle air system, the method comprising determining volumetric air flow through the air dryer, sensing operating states of the vehicle and in response thereto setting a threshold air volume, regeneration of said air dryer being initiated at said threshold.

Such a system preferably relies on relatively easily measurable parameters, and generates logical outputs based on those parameters in order to initiate a regeneration event. Typically apparatus for implementing the method uses vehicle status indicators such as brake on/off, clutch in/out, compressor on-load/off-load, which are related in a look-up table or control map in order to determine a vehicle operating state, such as overrun, dynamic braking, or vehicle stopped. Having determined the vehicle operating state, the threshold air volume can be determined from e.g. a second look-up table.

Apparatus for implementing the method may comprise a microprocessor adapted to receive logical inputs indicative of vehicle status, a first ROM to permit vehicle operating state to be determined from a plurality of said inputs, and a second ROM to permit a threshold air volume to be determined from said vehicle operating state.

Initiation of a regeneration event causes regeneration to occur at the earliest available opportunity. Regeneration may be delayed if inhibited due to overriding air demand for the air system.

The method preferably comprises the steps of setting or determining a default regeneration threshold of the air dryer indicative of a first volume of air passing therethrough, and determining an active regeneration threshold dependent on a vehicle operating state and indicative of a different volume of air passing therethrough.

The active regeneration threshold is preferably variable in real time dependent upon vehicle operating states, and in practice can override said default regeneration threshold.

The active regeneration threshold preferably comprises one of a plurality of discrete values, a plurality of vehicle operating parameters being related to determine the appropriate discrete value.

In a preferred embodiment, the default regeneration threshold is low, that is to say that a regeneration event will be initiated after a relatively low volume of air has passed through the air dryer. An active regeneration threshold may permit a greater volume of air to pass through the air dryer before a regeneration event is required, and several yet higher thresholds may be provided in response to different vehicle operating states.

The present invention allows regeneration to be advanced or postponed under certain circumstances, thus avoiding unnecessary usage of air which has been compressed and dried. Driving is a cyclical process and accordingly it can be anticipated that optimum circumstances for pumping and regeneration will occur from time to time. This invention allows the regeneration threshold to be varied intelligently rather than fixing a threshold on the basis of a worst case duty cycle. The invention also avoids the need for direct sensing of air humidity or moisture content of the desiccant and does not rely on a timer. Nevertheless the invention is adaptable to direct sensing of air humidity should a suitable sensor become available.

Information concerning air flow through the air dryer can be obtained from vehicle engine speed, compressor swept volume, compressor gear ratio and compressor on-load time. A compressor performance map may be used, in which values of engine speed and free air delivery (FAD) rates are correlated as a graph.

A first vehicle operating state may be steady driving, and a second vehicle operating state may be vehicle overrun, for example, coasting downhill. A third vehicle operating state may be dynamic braking.

A fourth operating state may for example be a static braking event (vehicle stopped). The regeneration threshold may be variable over a wide range.

The control system may inhibit regeneration of the air dryer in response to a vehicle operating state such as dynamic braking (vehicle being slowed) or very low system pressure. In the former case, a high degree of air dryer saturation may be tolerated if the control system gives absolute priority to air supply during events such as dynamic braking. The determination of whether the air dryer may be regenerated is thus under active control according to the vehicle operating state, and may change instantaneously with a change of operating state. In this way regeneration can be postponed or advanced to an optimum time.

Such a system permits opportunistic regeneration according to the vehicle operating state, and thus overcomes the problem of air wastage which is a consequence of the prior control systems. This system can also contribute to fuel saving by permitting regeneration at opportune times such as when the vehicle is on overrun. This in turn may permit a reduction in compressor rating since output for regeneration can be more evenly spread through a typical vehicle duty cycle, rather than being determined on a time basis or triggered automatically as a threshold pressure is reached.

The system may also overcome the problem of incomplete or insufficient regeneration as a consequence of prior control systems which cannot adapt the regeneration event to real time operating states of the vehicle.

Furthermore, the system allows regeneration to be largely inhibited at times when the vehicle is static or moving slowly, thus avoiding sudden loud noises which may frighten pedestrians or animals.

The system may include a number of inputs to permit vehicle operating state to be more closely defined. These may be compressor/engine speed (indicative of air flow through the air dryer), road speed, clutch status (in/out), brake status (on/off) and engine status (loaded/overrun and running/stopped).

In a preferred embodiment, the selected inputs are analysed according to a control map so that a measured state of an input is uniquely combined with each measured state of each other input to determine the active regeneration threshold.

Thus an embodiment may rely on five vehicle inputs, each of which may be assigned two states giving over 30 theoretical combinations, each of which is assigned an appropriate discrete value corresponding to a vehicle operating state. An embodiment may select between high and low regeneration thresholds, one of which may correspond to the default regeneration threshold, so that each vehicle operating state results in selection of one or other of the thresholds.

Typically the combinations may be held in a first look-up table of a ROM, to permit vehicle operating state to be ascertained, and a second look-up table allows vehicle operating state to be associated with a desired regeneration threshold.

Such an arrangement is advantageous since it permits in use adjustment of the regeneration thresholds according to the vehicle operating conditions, whilst not permitting any adjustment or tampering with the factors which first determine the vehicle operating state itself. Thus the first look-up table is fixed by vehicle type, but the thresholds determined from the second look-up table may be adjusted in use according to e.g. atmospheric conditions in the country of use. The values in the second look-up table can for example be adjusted according to readily measurable conditions, such as ambient temperature, pressure and humidity, and such values may be changed dynamically with the aid of suitable on-board sensors notwithstanding that compressor output is normally 100% saturated, this feature permits account to be taken of countries with very high or very low air moisture content.

In a simple control system according to the invention some of the inputs may be simple on/off signals. In the case of continuously variable states such as engine speed, the inputs may indicate low/high. Alternatively, the system may accommodate variable inputs, in discrete steps or continuously, with for example fuzzy logic for control.

In a refinement of the invention the input may be modified. Firstly the known Free Air Delivery (FAD) rate of the compressor may be adjusted according to the back pressure measured in the compressor supply duct. Thus a derating factor, typically between 0.6 and 1.0 may be applied, a larger derating occurring in cases where the back pressure is high and consequently delivery volume is reduced. The derating factor may be obtained from a compressor performance map. A second compressor performance map may be used in which back pressure is correlated against a compressor performance parameter such as output gallery pressure or volumetric delivery.

Additional derating factors which may be applied include desiccant volumetric flow, desiccant pressure and desiccant temperature. These derating factors may also lie in the range 0.6 to 1.0 and may be determined from suitable laboratory tests.

Desiccant temperature is relatively easily measured by means of a device such as a thermocouple. Typically warm air has a greater capacity for moisture than cold air, and measurement of temperature allows for derating to compensate for humid conditions.

Derating factors may be applied directly to the value of an input in order to determine more accurately the calculated air flow through the air dryer.

Derating to ensure more frequent regeneration may also be desirable in cold weather in order to avoid freezing of the moving parts of the usual regeneration valve.

Other features of the invention will be apparent from the following description of a preferred embodiment.

In the preferred embodiment, the control system determines one or more regeneration thresholds for the air dryer dependent on inputs from the vehicle systems. For example, a low threshold, giving regeneration at relatively low moisture content, may be set at times when braking demand is low. This arrangement ensures that the air dryer is maintained in a relatively dry state, rather than being allowed to accumulate moisture up to a somewhat higher predetermined regeneration threshold. A high threshold may conversely be set at times when braking demand is high. In these circumstances the air dryer will be allowed to approach a maximum tolerable moisture content so as to ensure that compressor output is not interrupted by an intermediate regeneration cycle. A yet higher threshold may be set at times when braking demand is very high or continuous, in which case moisture levels in the air dryer are a secondary consideration.

Vehicle operating states are determined from easily measurable parameters and may be used to set the regeneration threshold as follows:

Vehicle Engine Stopped

This state may be determined from an ignition circuit, an engine tachometer, or the usual engine management system.

Engine cranking resistance should be reduced to a minimum for starting, and therefore the compressor should be off-load to reduce engine drag. Remaining air in the reservoirs should be reserved for braking, and not used for regeneration of the air dryer. Accordingly the regeneration threshold is high (high moisture content permitted) and regeneration will not be triggered until a large volume of air has passed through the air dryer after the engine has started. This volume is calculated from an engine speed input (compressor output volume being a function of engine speed) and a compressor on-load time given by a system clock and an on-load/off-load input signal.

Vehicle Engine Idling

This state may be determined from an engine speed tachometer, clutch in/out and brake off/on inputs.

The requirement for air for braking is low because the vehicle is stopped; thus air demand is low. Also, regeneration should be inhibited to avoid sudden noise from stationary vehicle. Accordingly, regeneration threshold is high.

Dynamic Braking

This state may be determined from a vehicle speed input and a brake off/on input.

Air demand is high and the compressor is most likely to be on-load in order to replenish the air reservoir. Furthermore additional engine drag from an on-load compressor may be beneficial in slowing the vehicle. Accordingly, regeneration threshold is high, thus permitting maximum throughput of air into the braking system, usually at no fuel cost because the throttle is off during a braking event.

Static Braking

This state can be determined from a vehicle speed input and a foot brake off/on input or a handbrake off/on input.

Air demand is high, but compressor should be off-load if possible since to replenish the braking system will increase fuel usage. In these circumstances it is better to wait until an engine overrun condition, during which the compressor can be driven without using fuel. Regeneration threshold is accordingly high.

Engine Overrun

This state can be determined from a vehicle speed input and a throttle on/off input.

During overrun, the compressor is driven by the engine at no fuel cost. Thus this is the best time to put the compressor on-load. The vehicle will be slowed slightly due to compressor working resistance which is usually advantageous. Regeneration threshold can be high.

Driving

This state can also be determined from a vehicle speed input and a throttle on/off input.

The compressor is typically off-load, having charged the reservoir. The regeneration threshold can be low (regeneration at low moisture content), thus permitting regeneration at a time when the air reservoir is full and air demand is low.

Engine overrun and driving inputs may also be inhibited below a predetermined vehicle speed so as to indicate this state only during highway driving.

Gear Shifting

This state can be determined from a gear selection indicator, or from a pressure sensor of a servo assistance device for the gearshift lever.

Again, air demand by the braking system is low, and the compressor off-load. Regeneration threshold can be low.

Neutral Throttle

This state indicates that engine power is being used, but not for active driving of the vehicle. For example a Power Take Off or powered attachment might be in use and accordingly the regeneration threshold should be high since air is not required for the braking system. This state can be determined according to an on/off PTO switch for example.

Moving Off From Rest

This state can be determined from e.g. vehicle speed and gear selection. Noisy regeneration should be avoided at low speed. Accordingly, regeneration threshold should be high.

Pump Up

Under these circumstances the vehicle driver is demanding air, for example for the braking system, for initial pressurization of the system. Accordingly the requirement for air supply overrides air quality. Regeneration threshold should be very high, or regeneration should be inhibited under these circumstances.

A system having two regeneration levels has been described, but a system having more regeneration levels is possible. For example, the regeneration level during braking events (both static and dynamic) can be very high or regeneration may be inhibited on the basis that the compressor should be able to supply air without delay should the brake system have an air demand. This modification simply requires an alternative threshold air volume to be stored in the ROM of the preferred embodiment.

The invention claimed is:

1. A method of controlling regeneration of an air dryer in a vehicle air system of a vehicle, the method comprising:
   providing a vehicle air system with an air dryer;
   determining volumetric air flow through the air dryer;
   sensing operating states of the vehicle;
   setting a threshold air volume in response to the sensed operating states of the vehicle; and
   initiating regeneration of said air dryer at said threshold air volume to regenerate said air dryer of said vehicle air system.

2. A method according to claim 1 and further including the steps of setting or determining a default regeneration threshold of the air dryer indicative of a first volume of air passing therethrough, and determining an active regeneration threshold dependent on a vehicle operating state and indicative of a different volume passing therethrough, said threshold air volume being one of said active regeneration threshold and default regeneration threshold.

3. A method according to claim 2 wherein said active regeneration threshold is variable in real time, depending upon vehicle operating states.

4. A method according to claim 3 wherein said active regeneration threshold comprises one of a plurality of discrete values, a plurality of vehicle operating parameters being summed to determine said one of said plurality of discrete values.

5. A method according to claim 4 wherein said default regeneration threshold is lower than said active regeneration threshold.

6. A method according to claim 1 wherein a first vehicle operating state is steady driving, a second vehicle operating state is vehicle overrun, a third vehicle operating state is dynamic braking and a fourth operating state is a static braking event.

7. A method according to claim 6 and further including receiving a plurality of inputs to determine said vehicle operating states, said inputs being one or more of compressor/engine speed, road speed, clutch status, brake status and engine status.

8. A method according to claim 7 wherein one or more of said inputs are on/off signals.

9. A method according to claim 1 and further including applying at least one of a plural derating factors for reducing said threshold air volume, said plural derating factors being applied based on predetermined values of at least one of compressor output back pressure, desiccant volumetric flow, desiccant pressure and desiccant temperature.

10. A method according to claim 9 wherein said derating factors lie in the range 0.6–1.0.

* * * * *